UNITED STATES PATENT OFFICE.

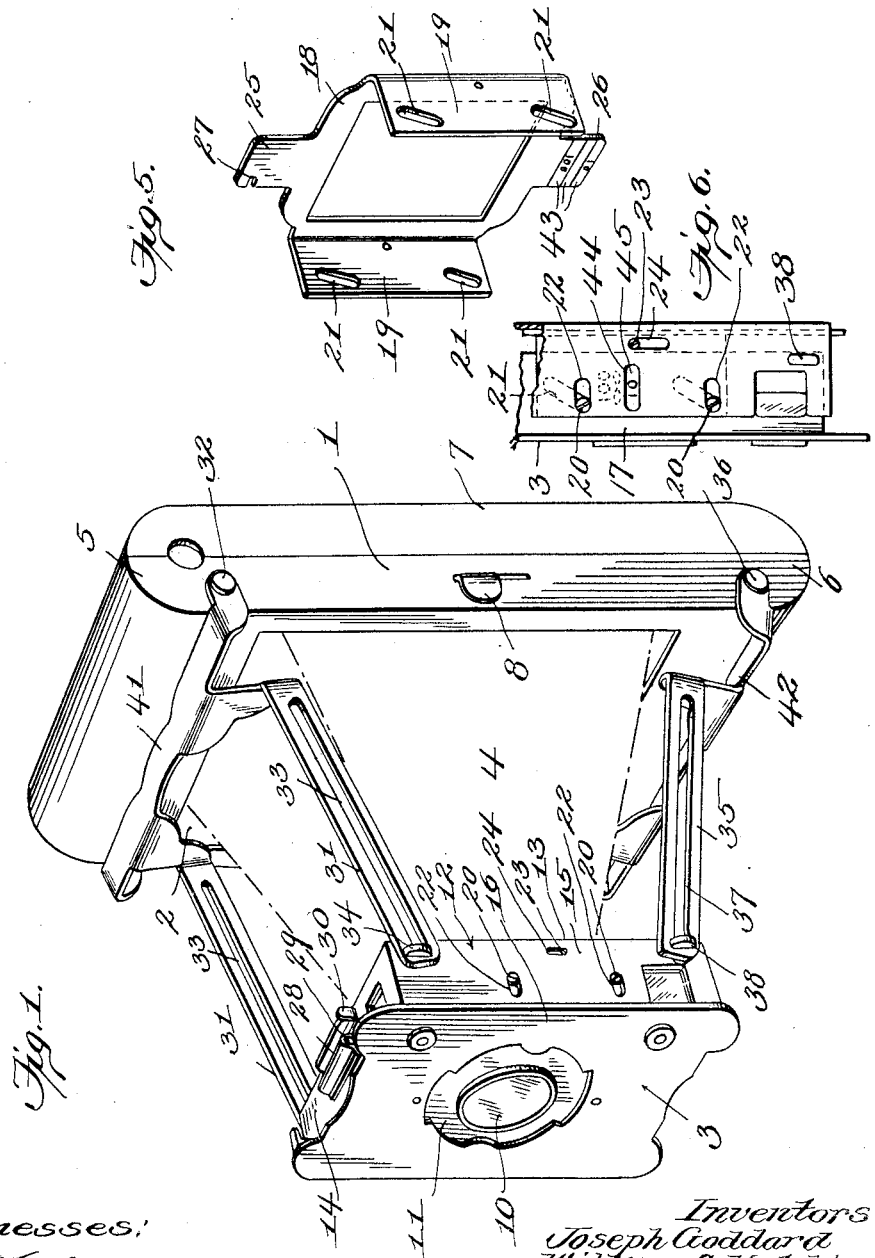

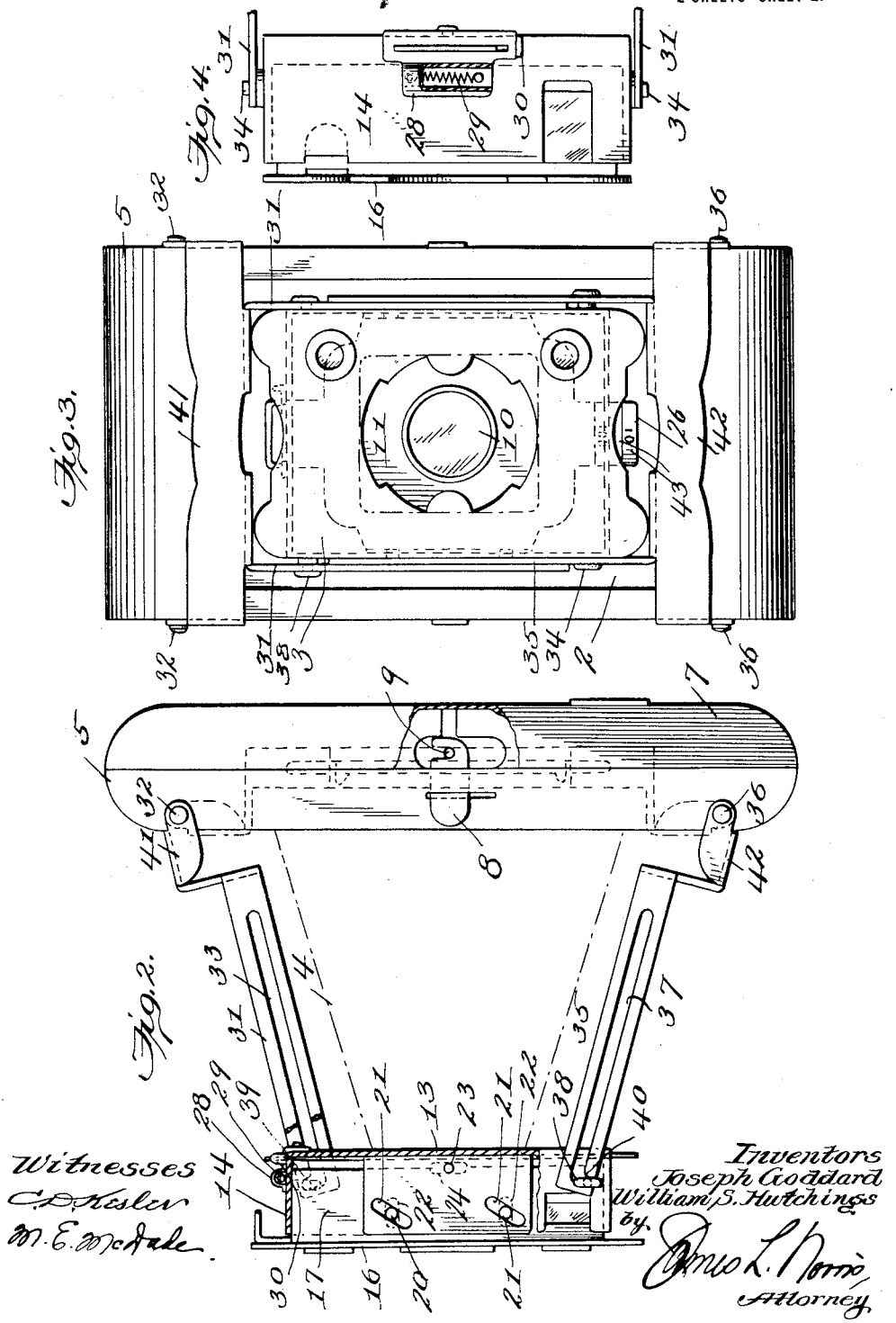

JOSEPH GODDARD AND WILLIAM S. HUTCHINGS, OF ROCHESTER, NEW YORK, ASSIGNORS TO SENECA CAMERA MANUFACTURING COMPANY, OF ROCHESTER, NEW YORK, A CORPORATION OF NEW YORK.

LENS-FOCUSING DEVICE.

1,214,453.     Specification of Letters Patent.     Patented Jan. 30, 1917.

Application filed February 8, 1916. Serial No. 77,051.

*To all whom it may concern:*

Be it known that we, JOSEPH GODDARD and WILLIAM S. HUTCHINGS, citizens of the United States, residing at Rochester, in the county of Monroe and State of New York, have invented new and useful Improvements in Lens-Focusing Devices, of which the following is a specification.

The present invention relates to improvements in focusing devices for lenses, and it is more especially applicable to photographic cameras for focusing the lenses thereof.

The primary object of the invention is to provide improved lens focusing means which greatly facilitates the focusing operation, which securely maintains the optical axis of the lens in a fixed direction, and which is compact and inclosed so as to present a neat appearance and is protected from injury or damage.

Another object of the invention is to provide lens focusing means which, when applied to a camera, will normally maintain the lens in position for the usual or universal focus, and which will insure automatically the return of the lens to its usual or universal focus position, should the focus of the lens be changed.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 is a perspective view of a photographic camera having applied thereto a lens focusing device constructed in accordance with the present invention. Fig. 2 represents a side elevation of the camera with its focusing device as shown in Fig. 1. Fig. 3 is a front elevation of the camera as shown in Figs. 1 and 2. Fig. 4 is a top plan view of the lens front of the camera as shown in Figs. 1–3 inclusive. Fig. 5 is a detail perspective view of one of the elements of the lens focusing device. Fig. 6 is a detail view of a portion of the lens focusing device showing another mode of indicating the focusing positions of the lens.

Similar parts are designated by the same reference characters in the several views.

A lens focusing device embodying the present invention is applicable generally to lenses as applied to optical purposes in general where it is desirable or necessary to set the lens at different focuses. The invention is particularly applicable to photographic cameras and it is capable of being applied to cameras of all types which employ a lens which is capable of being set in different positions of focus, although it is most advantageously applied to a camera of the folding type or one having a lens front which is extended from the body proper of the camera when the same is in use and is collapsed against or into the body proper of the camera when the same is not in use.

One embodiment of the invention is shown in the accompanying drawings and will be hereinafter described in detail, but it is to be understood that the invention is not restricted to this particular embodiment shown, as equivalent constructions are contemplated and will be included within the scope of the claims at the end of the specification.

In the present instance, the camera is of the folding type, it comprising a body proper 1 having a recess or chamber 2 in its forward side to contain the lens front 3, the bellows 4, and the devices which guide and support the lens front, the ends 5 and 6 of the body proper of the camera providing chambers to contain the spools to which the ends of a flexible sensitized film are attached. A cover 7 is shown removably applied to the rear side of the body proper of the camera, this cover affording access to the interior of the body proper of the camera to permit insertion and removal of the film, and a sliding catch 8 is provided at each side of the camera proper to coöperate with a pin or projection 9 on the corresponding side of the cover to secure the latter in position. The body proper of the camera, however, may be constructed in any other suitable way.

In photographic cameras of the folding type, portions of the sensitized film are successively brought into the field of the lens and the exposure is made while the lens is extended out from the body proper of the camera, as shown in Figs. 1 and 2, the bellows 4 preventing access of light to the sensitized film except through the lens. In the present instance, the lens 10 is carried by a suitable mounting 11, it being preferable to employ a mounting such as those commonly used which embody a shutter for determining the duration and character of the exposure, and the lens mounting is secured to the lens front.

The lens front, according to the present embodiment of the invention, contains the lens focusing device, or in other words, the lens focusing device, according to the present embodiment of the invention, also provides or serves the purpose of a lens front. As shown, the lens front comprises a casing 12 which is preferably rectangular, as shown, it having a rear wall 13, top and bottom walls 14, and side walls 15. The camera front also comprises a front plate 16 which, as stated, carries the lens 10 and its mounting 11, this front plate having secured to its rear side a guide 17 which fits into the casing 12 and forms a guide which will permit relative forward and rearward movement of the front plate 16 and the lens for focusing purposes but will prevent tilting of the lens. As shown, the guide 17 fits directly against the top and bottom 14 of the outer casing while the sides of the guide are spaced from the sides 15 of the casing to accommodate a focusing slide 18. This focusing slide comprises a body portion which is apertured to avoid obstructing the light passing through the lens and it has actuating members 19 attached to or formed on its vertical sides and arranged to operate vertically in the spaces between the sides of the guide 17 and the sides of the casing 12. According to the present invention, vertical movement of the focusing slide 18 will cause the lens carrying plate 16 to move forwardly or rearwardly, according to the direction of movement of the slide, to set the lens in different focusing positions. The means shown in the present instance for accomplishing this result comprises one or more screws or projections 20 secured in the respective sides of the guide 17, these screws or projections extending through inclined or diagonally arranged slots 21 formed in the actuating member 19 of the focusing slide and resting in horizontal slots 22 formed in the side walls 15 of the outer casing of the lens. Preferably, a pair of screws or projections are fitted into each side of the guide 17 and corresponding pairs of slots 21 and 22 are provided for these screws or projections, as shown. In order to guide the focusing slide 18 in its movement, a screw or projection 23 is preferably fitted into each lateral or actuating member 19 of the slide and is arranged to operate in a vertical guiding slot 24 formed in the respective side wall 15 of the outer casing. Means is provided for actuating the focusing slide from the exterior of the lens front. As shown, extensions 25 and 26 are formed on the top and bottom, respectively, of the slide, and these extensions pass through openings formed in the top and bottom walls of the outer casing 12. In the construction shown, upward pressure on the lower extension 26 of the focusing slide will shift the latter upwardly, the walls of the inclined slots 21 then acting on the screws or projections 20 to shift the front plate 16 and the lens carried thereby forwardly, thus setting the lens for a short focus. Pressure upon the upward extension 25 of the focusing slide will shift the latter downwardly, causing the front plate 16 and the lens carried thereby to be shifted rearwardly, thus setting the lens for a relatively long focus. When the focusing slide occupies a position intermediate of the two positions just described, the lens will be set for the focus which is most usually employed and which focus may, for practical purposes, be regarded as a universal focus.

Inasmuch as almost all exposures are made with the lens set for the intermediate or universal focus, it is essential, in making all ordinary exposures, that the lens be set for universal focus. To insure the setting of the lens for the ordinary or universal focus, a catch is provided which will normally retain the lens in position for ordinary or universal focus and it will be necessary to disengage or release this catch in order to move the lens out of its universal position and to set it either for a long or a short focus. In the present instance, one of the extensions on the focusing slide (the upper extension 25 in the present instance) is provided with a notch 27, and a catch 28 is slidably mounted on the top of the outer casing 12, the catch having a portion arranged to engage in the notch 27 to set and hold the focusing slide at a point where the lens will be properly positioned for the usual or universal focus. A spring 29 acts on the catch with a tendency to engage it with the notch 27, and a finger-piece 30 is provided on the catch to facilitate its retraction when it is desirable or necessary to set the lens either for a long or a short focus. When the focusing slide is shifted toward its central position to return the lens to universal focus, the catch 28 will automatically snap into the notch 27 and will thereby arrest further movement of the slide. In the construction shown, forward or rearward pressure applied to the front plate 16 which carries the lens will cause reciprocation of the focusing slide 18 unless the catch is engaged in the notch 27. For example, if the focusing slide is in its lower position, the front plate 16 which carries the lens will then occupy its rearmost position, and by pulling forward upon the front plate the focusing slide 18 will rise until it reaches a position corresponding with the universal focus position of the lens, and when the focusing slide reaches this position the catch will automatically snap into the notch 27, retaining the focusing slide and consequently the lens in position for the ordinary or universal focus. Likewise, if the focusing slide is in raised position or set for a short focus, a rearward pressure on the front plate 16 which carries the lens will move this plate rearwardly and will cause a downward reciprocation of the focusing slide 18 until the latter reaches a position corresponding to the ordinary or universal focus position of the lens, whereby the catch 28 will snap into the notch 27 and retain the slide and consequently the lens in position for ordinary or universal focus. This feature of the present invention is particularly advantageous when the invention is applied to photographic cameras of the type wherein the lens is carried by a front or equivalent part which is extended forward preparatory to the use of the camera and is pushed back against or into the body proper of the camera when the use of the camera is to be discontinued, for the reason that, if the lens has been set for a focus other than the ordinary or universal focus during the use of the camera, the force applied to the front or lens carrying plate, either in extending the lens forward from the body proper of the camera preparatory to the use thereof, or in restoring the lens against or within the body proper of the camera, will automatically reset the lens in the ordinary or universal focus position and the catch will automatically retain the lens in such position. This advantage of the present invention will be attained in applying the invention to cameras of various folding types, it being shown applied to one type of folding camera in the present instance wherein a pair of links 31 are pivoted at 32 to the body proper 1 and have slots 33 to slidably receive projections 34 attached to the outer casing of the lens front, while a similar pair of links 35 are pivoted at 36 to the body proper of the camera and have slots 37 which slidably receive projections 38 attached to the outer casing of the lens front. The links 31 and 35 when extended have a convergent position and the slots 33 and 37 in these links are preferably provided with offset portions 39 and 40 in which the projections 34 and 38, respectively, rest, the projections 34 and 38 causing the links 31 and 35 to be spread apart as the lens front approaches its forward position, and the resistance offered by the links to spreading thereof causing the projections 34 and 38 to be firmly seated in the offset portions 39 and 40. In this manner, proper seating of the lens front when the same is extended is insured. The necessary resistance offered by the links 31 and 35 to insure seating of the projections in the offsets 39 and 40 may be afforded, as in the present instance, by forming the cross-pieces 41 and 42 connecting the respective pairs of links in such shape that they will abut against the forward side of the body portion of the casing when the lens front approaches its foremost position, the resilience of the links or their connecting parts affording the necessary yield to permit the projections 34 and 38 to enter the offset portions 39 and 40. In applying the invention to a folding camera of this type, the resistance offered to the disengagement of the projections 34 and 38 from the offset portions 39 and 40 will be sufficient to cause the lens to be reset to the ordinary or universal focus position when pressure is applied to the front plate 16 to restore the lens front to its collapsed position within the body proper of the camera. Also, when the lens front is pulled forward, the projections 34 and 38 will reach the ends of the slots 33 and 37, and the tension exerted on the front plate 16 will then reset the lens for the ordinary or universal focus, should it happen that the lens front was restored to the casing while the lens was set in its rear or long focus position.

Preferably, means is provided for indicating the focusing position occupied by the lens. As shown in Figs. 3 and 5, the lower extension 26 which extends more or less beyond the bottom of the outer casing of the lens front is provided with an appropriately designated scale 43 which indicates the particular focusing position in which the lens is set. If desired, however, the arrangement shown in Fig. 6 may be used, one of the side walls 15 of the outer casing of the lens front in this instance having a slot 44 cut therein, and the adjacent side member 19 of the focusing slide is provided with an appropriately graduated scale 45, portions of which are visible through the slot in the casing to designate the focusing position of the lens.

We claim as our invention:—

1. A lens focusing device comprising a lens carrying member, a supporting member, an adjusting member movable relatively to said supporting and lens carrying members for shifting the latter to focus the lens, and means for normally retaining said adjusting member in a predetermined focusing position.

2. A lens focusing device comprising a support, a relatively movable lens carrying member, a lens focusing member movable relatively to said support and lens carrying member, and means for normally retaining the lens focusing member in predetermined focusing position.

3. A lens focusing device comprising a support, a relatively movable lens carrying member, a lens focusing member movable relatively to said lens carrying member, and a catch operative automatically to retain the lens focusing member in predetermined focusing position.

4. A lens focusing device comprising a support, a lens carrying member movable relatively to the support in the direction of the axis of the lens, and an adjusting member reciprocable relatively to said support and lens carrying member in a direction transversely to the axis of the lens to adjust the lens carrying member to focus the lens.

5. A lens focusing device comprising a support, a lens carrying member movable relatively to said support in the direction of the axis of the lens, said member having an operating portion exposed exteriorly of said support, and a member movable relatively to said support and lens carrying member and controlling the movement of the lens carrying member relatively to said support.

6. A lens focusing device comprising a support, a lens carrying member movable relatively to said support in the direction of the axis of the lens, said member having an operating portion exposed exteriorly of said support, and a member movable relatively to said support and lens carrying member by force applied to the exposed operating portion of the lens carrying member to control the movement of the lens carrying member relatively to said support.

7. A lens focusing device comprising a support, a lens carrying member movable relatively thereto to focus the lens, and an adjusting member reciprocable relatively to said support and the lens carrying member to shift the latter relatively to the support, said adjusting member having oppositely positioned operating portions located exteriorly of the support.

8. A lens focusing device comprising a support, a lens carrying member movable relatively thereto to focus the lens, an adjusting member reciprocable relatively to said support and the lens carrying member to shift the latter relatively to the support, and a catch operative automatically to retain the adjusting member in a predetermined position when said member is moved into said position.

9. A lens focusing device comprising a support, a lens carrying member movable relatively thereto to focus the lens, a member movable relatively to the support and lens carrying member and by force applied to the latter for indicating the different focusing positions of the lens carrying member.

10. A lens focusing device comprising a support, a lens carrying member movable relatively thereto to focus the lens, a member movable relatively to the support and lens carrying member and by force applied to the latter, and a device coöperative with said second mentioned member for automatically retaining the lens carrying member in a predetermined focusing position.

11. In a camera of the folding type, the combination of a support adapted to be extended and collapsed relatively to the body of the camera, a lens carrying member movable relatively to said support, and means for automatically and normally retaining the lens carrying member in a predetermined focusing position under the influence of a force applied to extend or callapse the support relatively to the body of the camera.

12. In a camera of the folding type, the combination of a support adapted to be extended and collapsed relatively to the body of the camera, a lens carrying member movable relatively to said support and providing means to extend and collapse the same relatively to the camera body, and means for controlling the setting of the lens by force applied to the lens carrying member.

13. In a camera of the folding type, the combination of a support adapted to be extended and collapsed relatively to the body of the camera and having means for holding it in extended position, a lens carrying member movable relatively to the support to focus the lens and providing means for the application of force to extend or collapse the support relatively to the camera body, and means controlled by force applied to the lens carrying member for automatically retaining the latter in a predetermined lens focusing position.

14. In a camera of the folding type, the combination of a support adapted to be extended and collapsed relatively to the body of the camera and having means for holding it in extended position, a lens carrying member movable relatively to the support to set the lens for ordinary or universal focus and for relatively longer and shorter focuses respectively, said member providing means for the application of force to extend and collapse the support relatively to the camera body, and means operative automatically to retain the lens carrying member in the ordinary or universal focus position when the same is brought into such position.

15. In a photographic camera, a combined lens front and focusing device comprising a supporting casing, a lens carrying member movable relatively to the casing in the direction of the axis of the lens, and a reciprocatory member movable relatively to said casing and the lens carrying member for adjusting the latter and the lens for different focuses.

16. In a photographic camera, a combined lens front and lens focusing device comprising a supporting casing having means for mounting it in coöperative relation with the camera body, a lens carrying member movable relatively to the casing in a direction forwardly and rearwardly thereof, and a transversely reciprocable member coöperative with the support and lens carrying member to adjust the latter and the lens for different focuses.

17. In a photographic camera, a combined lens front and lens focusing device comprising a supporting casing having means for mounting it in coöperative relation with the camera body, a lens carrying member at the front of the casing and movable in a direction forwardly and rearwardly thereof, and a member within the casing movable transversely thereof and having projections at opposite sides of the casing for adjusting the lens carrying member for different lens focuses.

18. A lens focusing device comprising a substantially rectangular casing, a lens carrying member closing the front of said casing and guided to move forwardly and rearwardly relatively to the casing, and a member guided to reciprocate within the casing and coöperating with the casing and the lens carrying member to adjust the latter into different lens focusing positions.

19. In a folding or collapsible photographic camera, a folding portion movable into an extended position and also movable into a collapsed position, a lens-carrying member movable relatively to said folding portion to and from a universal focusing position, and means coöperative with said lens-carrying member whereby the latter is automatically returned to universal focusing position by the application of force to effect one of the said movements of the folding portion of the camera.

20. In a photographic camera, a lens carrying member adjustable in the direction of the optical axis of the camera for focusing, and a detent for normally retaining the lens carrying member in universal focusing position, said detent being inoperative when the lens carrying member is adjusted to any position other than universal focusing position.

21. A lens focusing device comprising a casing, an adjustable cover plate for said casing movable in the direction of the optical axis of the lens, a lens carried by said cover plate, and means within the casing for adjusting the cover plate, said means being operable from the exterior of the casing.

22. In a folding or collapsible camera having a camera back, a member adjustable toward and from the camera back to fold or extend the camera, a lens-carrying member adjustable on and relatively to said first-mentioned member in the direction of the optical axis of the camera to or from a universal focusing position, and means coöperating with said lens-carrying member and with relation to which said lens-carrying member is movable for automatically returning the lens-carrying member to universal focusing position upon the application of force to effect one of the said movements of the first-mentioned member of the camera.

In testimony whereof we have hereunto set our hands in presence of two subscribing witnesses.

JOSEPH GODDARD.
WILLIAM S. HUTCHINGS.

Witnesses:
MARGARET C. WUEST,
MARGARET F. CONSLER.

Copies of this patent may be obtained for five cents each, by addressing the "Commissioner of Patents, Washington, D. C."